United States Patent
Eisenbach et al.

(10) Patent No.: US 11,293,314 B1
(45) Date of Patent: Apr. 5, 2022

(54) AUTONOMOUS OIL CHANGE

(71) Applicants: Solomon Eisenbach, Brooklyn, NY (US); Shmaya Eisenbach, Brooklyn, NY (US); Zacharia Eisenbach, Brooklyn, NY (US)

(72) Inventors: Solomon Eisenbach, Brooklyn, NY (US); Shmaya Eisenbach, Brooklyn, NY (US); Zacharia Eisenbach, Brooklyn, NY (US)

( * ) Notice: Subject to any disclaimer, the term of this patent is extended or adjusted under 35 U.S.C. 154(b) by 0 days.

(21) Appl. No.: 17/104,290

(22) Filed: Nov. 25, 2020

(51) Int. Cl.
| F16N 33/00 | (2006.01) |
| F01M 11/04 | (2006.01) |
| B60S 5/00 | (2006.01) |
| G05B 15/02 | (2006.01) |
| F04D 13/06 | (2006.01) |

(52) U.S. Cl.
CPC ............ F01M 11/0458 (2013.01); B60S 5/00 (2013.01); F01M 11/045 (2013.01); G05B 15/02 (2013.01); F04D 13/06 (2013.01)

(58) Field of Classification Search
CPC .. F01M 11/04; F01M 11/0458; F01M 11/045; B60S 5/00; G05B 15/02
See application file for complete search history.

(56) References Cited

U.S. PATENT DOCUMENTS

| 4,807,674 A * | 2/1989 | Sweet | B65D 1/18 137/205 |
| 5,056,621 A * | 10/1991 | Trevino | F01M 11/0458 184/1.5 |
| 5,148,785 A * | 9/1992 | Sendak | F01M 11/045 123/196 R |
| 5,238,085 A * | 8/1993 | Engelmann | F01M 11/04 123/196 S |
| 5,415,247 A * | 5/1995 | Knorr | F01M 11/0458 141/65 |
| 6,073,666 A * | 6/2000 | Clark, II | F01M 11/0458 141/65 |
| 6,286,626 B1 * | 9/2001 | Evans | F01M 11/0458 141/98 |
| 7,686,136 B2 * | 3/2010 | Evans | F01M 11/04 184/1.5 |
| 2002/0148528 A1 * | 10/2002 | Matthews | F01M 11/04 141/65 |
| 2004/0084105 A1 * | 5/2004 | Awad | F04F 1/02 141/65 |

(Continued)

*Primary Examiner* — Michael A Riegelman
(74) *Attorney, Agent, or Firm* — Lyman Moulton, Esq.; Moulton Patents, PLLC

(57) ABSTRACT

The Autonomous Oil Change System allows a user to arrive at a station and conduct an oil change on their vehicle. They do so by opening the lid/cover located on the front of the car on the machine to process the payment. This permits the user to insert their debit/credit card on the machine to process their payment and to begin the process and receive an oil change in a few minutes with a receipt and a date recommendation for their next oil change. The system then performs the oil change autonomously. A first hose extends from an oil pan of a vehicle to an externally accessible point on the vehicle. A sensor indicates a level of oil and generates a signal for a pump to draw an oil in the oil pan via the hose externally accessible on the vehicle based on the signal from the sensor.

18 Claims, 1 Drawing Sheet

(56) References Cited

U.S. PATENT DOCUMENTS

| | | | | |
|---|---|---|---|---|
| 2004/0261748 | A1* | 12/2004 | Lafleur | F01M 11/0458 123/196 R |
| 2007/0113894 | A1* | 5/2007 | Apostolides | F01M 11/0458 137/266 |
| 2007/0113921 | A1* | 5/2007 | Capizzo | B60K 15/067 141/231 |
| 2013/0074985 | A1* | 3/2013 | Ferguson | F01M 11/0458 141/98 |

* cited by examiner

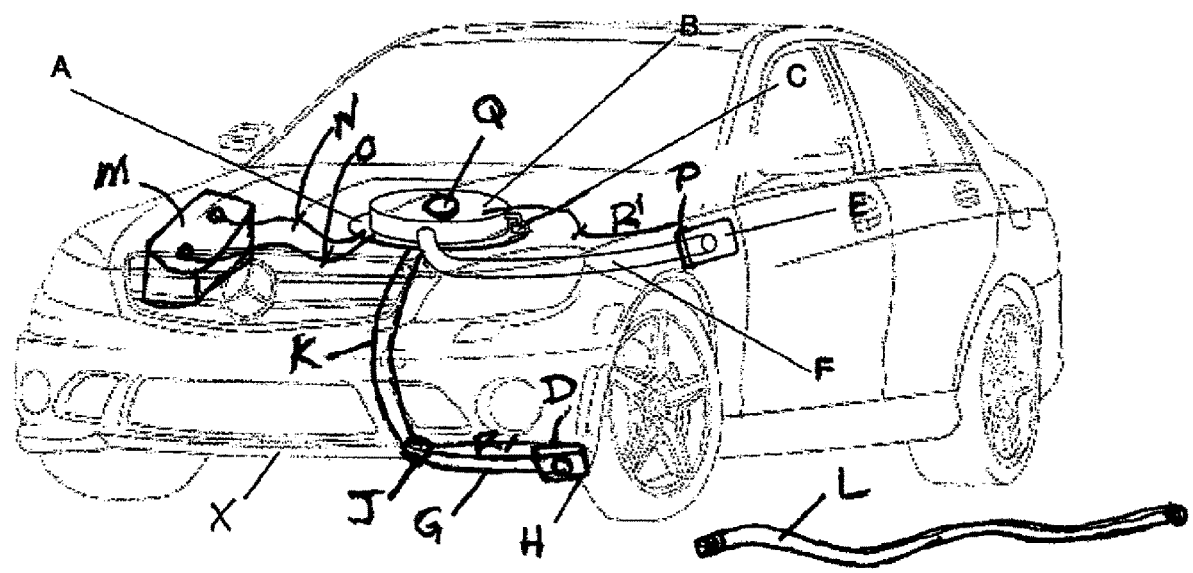

AUTONOMOUS OIL CHANGE

BACKGROUND

A motor vehicle is an essential form of transportation for people who desire to travel locally or cross country. However, after a certain amount of mileage, a care needs a periodic oil change for the vehicle to function properly, but such maintenance can be extremely costly as well as time consuming. Without a proper oil change a vehicle can experience further engine complications, in a short period of time, making the car more expensive to repair. There have been no products available as original equipment or as an aftermarket to address this problem.

There have been no products available as original equipment or as an aftermarket to address these shortfalls.

SUMMARY OF THE INVENTION

The main purpose of the Autonomous Oil Change is to allow an individual to simplify the process of changing the oil in their vehicle. The Autonomous Oil Change System is developed specially to provide a system to enable drivers to change the oil for their vehicles independently.

The Autonomous Oil Change System can service any make or model for a clean, no filter, hands free oil change. It is uniquely designed to offer various components: a sensor, pump and pipes to make the oil changing process for vehicles simpler with no more wait time or appointments with mechanics.

An Autonomous Oil Change user can simply arrive at a station to conduct this procedure by opening the lid/cover located on the front of the car on the machine to process the payment. This feature will permit the user to insert their debit/credit card on the machine to process the payment. This feature will permit the user to press the start button to begin the process and receive an oil change in a few minutes with a receipt and a date recommendation for their next oil change.

BRIEF DESCRIPTION OF THE DRAWINGS

FIG. 1. is a depiction of the autonomous oil change system in accordance with an embodiment of the disclosure.

Throughout the description, reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The main purpose of the Autonomous Oil Change is to provide an automobile oil changing arrangement, specifically to allow an individual to simplify the process. The autonomous vehicle oil change system allows an individual to perform an oil change to their automobile independently. Comprised of various metals and pipes, the disclosure is intended to function as a standard machine that can with a sensor base and an oil drain tray underneath while connected to a pipe and pump device. With a magnet/clip feature on the topside of the hole opening, this will enable the driver or operator to position the pump so it may lock in place until the oil change is completed as well as automatically recognize the model and make of the user's car (also mileage, amount of oil quarts needed for the vehicle etc.) furthermore, the apparatus will include three to four pipes for: new oil, vacuum to remove old oil and water to washout the tank (if needed).

FIG. 1 is a depiction of the autonomous oil change system in accordance with an embodiment of the disclosure. The depiction includes the sensor A, the discrete oil pan B, the pump C internal to the vehicle and onboard, the oil drain pan D, the lid cover with lock and magnet E, the hose F, the second hose K, the third hose G, the second cover H, the valve J, the discrete hose L, the lid release wire R1, the microprocessor Q, the battery M, the positive lead N and the negative lead O and the second lid cover D and the hinge P and the front fender X. The discrete hose L connects or extends to an externally accessible point on the vehicle to provide a distal drainage point for used motor oil from the vehicle. A battery M hookup of the positive lead N and the negative lead O powers the disclosure. The pump C is disposed at an oil drain pan D of the vehicle and pressurizes an existing oil system of the vehicle. The valve J is disposed proximal a connection of the second hose K to the oil drain pan D to electronically and mechanically control a flow of oil there through from a controller outside the vehicle. Once the pump creates or starts a siphon, the oil flows on its own accord unaided by the pump in embodiments of the disclosure according to a common definition of the term siphon.

A sensor A is used when a driver swipes their debit/credit card on the discrete machine and for payment. The receipt would also indicate the date the next oil change should be performed. Once the payment has been processed the sensor A would check how much oil would need to be drained. The sensor A would then monitor if a water washout would be needed before refilling. The next step for the sensor A would be to refill the oil to the necessary filled level. The sensor A will automatically recognize the model and make of the user's car (also mileage, amount of oil quarts needed for the vehicle etc.). The Pump C extracts the used oil from the engine to the tray B and pumps in the new oil. It connects to the Oil Drain Tray D and goes into the engine for extracting and replacing the oil. The Oil Drain Tray D is located underneath the sensor device A. It is designed to hold oil that is pumped in or out of the engine. It connects to a pipe F and pump device C.

The Lid/Cover E with Lock and Magnet has a feature on the topside of the hole opening, this enables the operator to position the pump so it may lock in place until the oil change is completed. The Magnet is intended to keep the pump in place during the oil change. The apparatus, Lid/Cover, will be attached to 3-4 pipes.

The first hose F runs from the drain pan to the external lid cover E. There are three to four pipes attached to the Oil Tray. These pipes are used to vacuum out and extract the old used oil, pump in water to washout the tank (if needed) and pump in new oil.

The autonomous oil change system uses an existing oil drain pan in a vehicle and uses the force of gravity and a siphon to drain the oil pan from an existing drain plug opening in an embodiment. Another embodiment uses a second oil drain pan located in a position between the existing oil drain pan and an external body cover/lid for oil extraction. The second oil pan embodiment uses a pump to drain the oil from the existing or original equipment manufacture (OEM) drain pan. Therefore, a pressurized embodiment and a non pressurized embodiment are included in the present disclosure according to design constraints and market needs. An external hose is also included for facilitating oil disposal into containers for processing and disposal. Mechanical and plumbing connections are included to facilitate OEM implementations and after market implementations.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. An oil change system comprising:
   a first hose extending from an oil pan of a vehicle to an externally accessible point on the vehicle;
   a sensor configured to sense a level of an oil in the oil pan and generate a signal indicating the level of the oil in the oil pan,
   a pump internal to the vehicle and onboard and configured to draw the oil in the oil pan via the first hose to the externally accessible point on the vehicle based on the signal from the sensor,
   wherein the pump is configured to create a siphoning of the oil via the first hose from the oil pan to the externally accessible point on the vehicle on its own accord unaided by the pump.

2. The oil change system of claim 1, further comprising a discrete hose configured to connect to the externally accessible point on the vehicle and provide a distal drainage point for the oil from the vehicle.

3. The oil change system of claim 1, wherein the externally accessible point on the vehicle is located on a fender of the vehicle.

4. The oil change system of claim 1, further comprising a fender door configured to hingedly cover the externally accessible point on the vehicle.

5. The oil change system of claim 1, further comprising a positive and a negative power hookup for the pump into an existing electrical battery of the vehicle.

6. The oil change system of claim 1, wherein the pump is an electrically powered pump.

7. The oil change system of claim 1, further comprising a second hose extending from inside the oil pan to an inlet of the pump and a third hose extending from an outlet of the pump to the externally accessible point on the vehicle.

8. The oil change system of claim 1, wherein the pump is disposed adjacent the oil pan and the pump is configured to pressurize the oil pan via a second hose and a second hose connection into the oil pan.

9. The oil change system of claim 1, wherein the first hose connects to a drain plug of the oil pan and extends to the external point of the vehicle.

10. The oil change system of claim 1, wherein the pump is disposed at an oil drain pan of the vehicle and is configured to pressurize an existing oil system of the vehicle.

11. An oil change system for a vehicle, the system comprising
    a hose connected to a drain plug orifice of an oil pan in the vehicle and extend from the oil pan to an externally accessible point on the vehicle,
    a sensor configured to sense a level of oil in the oil pan and generate a signal indicating the level of oil in the oil pan, and
    a pump internal to the vehicle and onboard and configured to draw an oil in the oil pan via the hose to the externally accessible point on the vehicle,
    wherein the pump is configured to create a siphoning of the oil via the hose from the oil pan to the externally accessible point on the vehicle on its own accord unaided by the pump.

12. The system of claim 11, wherein the externally accessible point on the vehicle is lower than the oil pan.

13. The system of claim 11, wherein the first hose draws an oil in the oil pan via the hose to the externally accessible point on a lower external point on the vehicle based on a force of gravity on a height difference thereof.

14. The system of claim 11, further comprising a pump configured to draw an oil in the oil pan via the hose to the externally accessible point on the vehicle based on a signal from a sensor indicating a level of oil in the oil pan.

15. The system of claim 11, further comprising a programmable memory configured with a make and a model and a preferred oil type via an input/output for a maintenance of the vehicle.

16. The system of claim 11, further comprising a door in an external body part of the vehicle configured to hingedly cover the externally accessible point on the vehicle.

17. The system of claim 11, further comprising a valve disposed at the connection of the hose to the oil pan drain plug orifice, the valve configured to electronically control a flow of the oil there through from a controller outside the vehicle.

18. The system of claim 11, further comprising a valve disposed at the connection of the hose to the oil pan drain plug orifice, the valve configured to mechanically control a flow of the oil from the oil pan based on a mechanical action at the externally accessible point on the vehicle.

* * * * *